United States Patent
Mittelstädt et al.

(10) Patent No.: US 10,873,286 B2
(45) Date of Patent: Dec. 22, 2020

(54) METHOD AND DEVICE FOR THE COMPUTER-ASSISTED OPERATION OF AN ELECTRIC MOTOR

(71) Applicant: Siemens Aktiengesellschaft, Munich (DE)

(72) Inventors: Sebastian Mittelstädt, München-Haidhausen (DE); Jonas Mlynek, Berlin (DE); Stefan Hagen Weber, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/469,022

(22) PCT Filed: Dec. 6, 2017

(86) PCT No.: PCT/EP2017/081614
§ 371 (c)(1),
(2) Date: Jun. 12, 2019

(87) PCT Pub. No.: WO2018/108651
PCT Pub. Date: Jun. 21, 2018

(65) Prior Publication Data
US 2019/0319574 A1    Oct. 17, 2019

(30) Foreign Application Priority Data
Dec. 16, 2016    (EP) .................................... 16204640

(51) Int. Cl.
*H02P 23/14*    (2006.01)
*H02P 29/66*    (2016.01)
(Continued)

(52) U.S. Cl.
CPC .............. *H02P 29/66* (2016.02); *H02P 1/029* (2013.01); *H02P 23/14* (2013.01); *H02P 29/68* (2016.02)

(58) Field of Classification Search
CPC ... G05B 19/04; G05B 19/042; G05B 19/0426
See application file for complete search history.

(56) References Cited

U.S. PATENT DOCUMENTS 5,697,705 A * 12/1997 Callewaert ................ G01J 5/02
219/494
5,790,437 A * 8/1998 Schuh ................ G05B 19/0426
700/11
(Continued)

FOREIGN PATENT DOCUMENTS

DE    102009001258 A1    9/2010
DE    102010063148 A1    6/2012
(Continued)

OTHER PUBLICATIONS

PCT International Search Report and Written Opinion of International Searching Authority dated Mar. 19, 2018 corresponding to PCT International Application No. PCT/EP2017/081614 filed Jun. 12, 2017.
(Continued)

*Primary Examiner* — Rina I Duda
(74) *Attorney, Agent, or Firm* — Schmeiser, Olsen & Watts LLP (57) ABSTRACT

Provided is a method for the computer-assisted operation of an electric motor which is exposed to a thermal load as a result of the rotational motion of its rotor during operation. In this method, measured data is received during the operation of the electric motor. One or more temperature values are derived from the measured data. A number of temperature characteristics curves are then forecast with differing restart times for defining a cooling period for reducing the
(Continued)

thermal load on the electric motor, wherein the approximated temperature value, which results from the approximated temperature value is used as the specific starting value for a restart in the temperature characteristics curve to be forecast.

15 Claims, 7 Drawing Sheets

(51) Int. Cl.
   *H02P 29/68* (2016.01)
   *H02P 1/02* (2006.01)

(56) References Cited

U.S. PATENT DOCUMENTS

| | | | |
|---|---|---|---|
| 6,260,414 B1 * | 7/2001 | Brown | G01F 23/22 73/295 |
| 9,496,817 B1 | 11/2016 | Lepka et al. | |
| 2007/0086508 A1 * | 4/2007 | Reading | G01K 1/022 374/208 |

FOREIGN PATENT DOCUMENTS

| EP | 3002871 A1 | 4/2016 |
|---|---|---|
| JP | 2008228564 A | 9/2008 |

OTHER PUBLICATIONS

European Search Report for application No. 2016P232298EP dated Jun. 8, 2017.

Non-English PCT International Search Report and Written Opinion of International Searching Authority dated Mar. 19, 2018 corresponding to PCT International Application No. PCT/EP2017/081614 filed Dec. 6, 2017.

Non-English European Search Report for application No. 2016P232298EP dated Jun. 8, 2017.

First Examination Report in corresponding Indian Patent Application No. 201947023048 dated Aug. 27, 2020. 6 pages.

* cited by examiner

METHOD AND DEVICE FOR THE COMPUTER-ASSISTED OPERATION OF AN ELECTRIC MOTOR

CROSS-REFERENCE TO RELATED APPLICATIONS

This application claims priority to PCT Application No. PCT/EP2017/081614, having a filing date of Dec. 6 22, 2017, which is based on European Application No. 16204640.3, having a filing date of Dec. 16, 2016, the entire contents both of which are hereby incorporated by reference.

FIELD OF TECHNOLOGY

The embodiment of the invention relates to a method and a device for the computer-assisted operation of an electric motor which is subjected, during its operation, to thermal loading by the rotational motion of its rotor. In particular, the method and the device relate to the determination of time information relating to the restart of the electric motor. The embodiment of the invention also relates to an associated computer program product and to a computer-readable medium.

BACKGROUND

In particular in the case of large drives whose rotors are subjected to high thermal loadings when starting up, it is very important to monitor the temperature of the rotating rotor in order to avoid damage as a result of overheating. In particular large drives, for example for the gas, oil or chemical industries, are particularly critical. So-called salient pole motors, which generate a large amount of heat in a short time during asynchronous starting up, are frequently used here as drives. If such a motor is started several times in succession, very high temperatures then arise quickly in its interior. If an electric motor is started too frequently, there is a risk of permanent damage to the electric motor. Therefore, cooling times have to be complied with between the switching off of the motor and the new revving up. The temperatures in the critical ranges in the interior of the motor cannot be measured directly in technical terms. Measurement of the temperature in the interior of the motor is only possible here, if at all, with a very large amount of expenditure. The necessary cooling time has therefore been determined conservatively until now, in order to reliably rule out thermal damage to the drive. The cooling times are often therefore clearly longer than would be necessary for technical reasons.

CAD models are generally produced during the development of the motors. On the basis of such models it is possible to postulate mathematical models which cover the geometry and the material of the motor, in order to determine the properties of the drives. Data-based methods are generally used in order to be able to infer the necessary idle times of the motor. However, such models are complex, so that they cannot be used in real time or can only be calculated with difficulty.

Therefore, for each drive the manufacturer defines time intervals for restarts which ensure that the drive cannot overheat if said time intervals are complied with.

When mathematical models are used which calculate the earliest possible time for a restart of the drive, all the model solutions with their uncertainties have to be taken into account. A simulation gives rise to a very large number of solutions. They are therefore suitable only to a small extent for the outputting and interaction of a user. Moreover, such mathematical models do not consider empirical values, so that non-optimum switching-on times are frequently determined for the earliest possible time for a restart of the drive.

EP 3 002 871 A1 discloses a method for the computer-assisted operation of an electric motor which is subjected, during its operation, to thermal loading by the rotational motion of its rotor. During the operation of the electric motor, measurement data are received. At least one temperature value, approximated to a virtual real value, is determined by means of a mathematical model, derived from the predefineable motor geometry, for physical variables of the overall state of the motor and from the received measurement data as input data. A number of temperature profiles with restart times are then predicted, wherein the temperature profiles are each dependent on the overall state of the electric motor and/or on the configuration of the electric motor, in order to define a cooling time period for reducing the thermal loading on the electric motor, wherein the approximated temperature value which results from the at least one virtual real value is input as a respect starting value for a restart to the temperature profile which is to be predicted. As a result, this method determines the duration of a cooling period of an electric motor on the basis of a temperature measurement and a model.

DE 10 2009 001 258 A1 discloses a method for the computer-assisted operation of an electric motor which is subjected, during its operation, to thermal loading by the rotational motion of its rotor. Measurement data measured during the operation of the electric motor are received, wherein the measurement data are electrical and/or kinetic physical variables of the electric motor. At least one temperature value which is approximated to a virtual real value is determined by means of a mathematical model, derived from a predefineable motor geometry, for physical variables of the overall state of the motor and from the received measurement data as input data. Subsequently, a temperature profile is displayed. The temperature of the motor is thus determined by means of a motor voltage, a motor current as well as the rotational speed and a model. In order to provide thermal relief, the electric motor is switched off for a limited time. The current thermal state is displayed.

U.S. Pat. No. 9,496,817 B1 discloses a method for the computer-assisted operation of an electric motor which is subjected, during its operation, to thermal loading by the rotational motion of its rotor. Measurement data measured during the operation of the electric motor are received, wherein the measurement data are electrical and/or kinetic physical variables of the electric motor. At least one temperature value, approximated to a virtual real value, is determined by means of a mathematical model, derived from a predefineable motor geometry, for physical variables of the overall state of the motor and from the received measurement data as input data. A number of temperatures is predicted, wherein the temperatures are each dependent on the overall state of the electric motor and/or on the configuration of the electric motor. As a result, the calculation of future thermal developments occurs in the electric motor.

DE 10 2010 063 148 A1 discloses a method for the computer-assisted operation of an electric motor which is subjected, during its operation, to thermal loading by the rotational motion of its rotor. Measurement data measured during the operation of the electric motor are received, wherein the measurement data are electrical and/or kinetic physical variables of the electric motor. At least one temperature value, approximated to a virtual real value, is determined by means of a mathematical model, derived from a predefineable motor geometry, for physical variables of the overall state of the motor and from the received measurement data as input data. Furthermore, a switch-off time period is determined. As a result, the temperature of the electric motor is determined by means of its motor current, the rotational speed, a pulse-width modulation ratio and an accumulator voltage, from which a motor voltage can be calculated. A switch-off time period and the temperature of the electric motor are not determined until the electric motor is switched on again.

SUMMARY

An aspect relates to a method and a device which permits information relating to the restarting of an electric drive to be determined with relatively high precision.

Another aspect relates to a computer program product (non-transitory computer readable storage medium having instructions, which when executed by a processor, perform actions)

A method for the computer-assisted operation of an electric motor is proposed. The electric motor is subjected, during its operation, to thermal loading by the rotational motion of its rotor. The method comprises the following steps:

Receiving measurement data measured during the operation of the electric motor, wherein the measurement data are electrical and/or kinetic physical variables of the electric motor. In particular, directly measured temperatures, rotational speeds, forces occurring in the rotor, are received as electrical and/or kinetic physical variables of the electric motor.

Determining at least one temperature value, approximated to a virtual real value, by means of a mathematical module, derived from a predefineable motor geometry, for physical variables of the overall state of the motor, and from the received measurement data as input data. According to this step, in addition to the received electrical and/or kinetic physical variables, what are referred to as soft sensor values which are derived from directly measured sensor values or other sensor values and/or predictions are determined. Predictions can be determined, for example, by means of a simulation of possible future scenarios.

Predicting a number of temperature profiles with different restart times, wherein the temperature profiles are each dependent on the overall state of the electric motor and/or on the configuration of the electric motor, in order to define a cooling time period for defining the thermal loading on the electric motor, wherein the approximated temperature value, which results from the at least one virtual real value, is input as a respective starting value for a restart into the temperature profile which is to be predicted. In this context, the cooling time period is understood to be a time period between the start of the prediction and the respective restart time. On the basis of the predicted number of temperature profiles it is possible to determine the resulting thermal loading for various restart times.

Displaying the temperature profile which lies in the past, together with the number of predicted temperature profiles in a time/temperature diagram, wherein the number of predicted temperature profiles represents a possible restart of the electric motor at the respective restart time with the respectively determined starting value. The temperature profile which lies in the past can be determined, for example, from the electrical and/or kinetic physical variables of the electric motor and/or the above-mentioned soft sensor values.

Determining a respective quality measure for the number of predicted temperature profiles, wherein the quality measure is a measure of the efficiency of how good the restart time is with respect to the expected thermal loading and a minimum of the cooling time period.

Mapping the quality measures onto a color scale which is visually output at a user interface, wherein time information relating to the restart of the electric motor is output in response to a user interaction which is input via the user interface.

The determination of a respective quality measure for the number of predicted temperature profiles and their mapping onto a color scale makes it easily possible to interact with a solution space. In particular, prediction uncertainties and prediction values can be displayed on the color scale without a loss of information. This permits a fault-free interaction and efficient operation of the electric motor.

The displaying of the quality measures on a color scale and the evaluation of a user interaction which is input via the user interface make it possible to find solutions quickly and efficiently, in order to determine an optimum restart time with respect to the thermal loadability and the duration of the cooling time.

The use of a quality measure and its mapping onto a color scale facilitates the determination of the quality of the determination of the restart time. When the certainty about a correct restart time is too low, further calculations can be carried out in response to a user interaction which is input via the user interface, until an optimum solution is found.

The use of a color scale for displaying a possible solution space makes it possible to determine a subsequent restart time quickly and precisely, and is, in particular, able to evaluate a respective uncertainty.

The time information relating to the restart of the electric motor can be transmitted directly to a connected control unit for controlling the electric motor.

One development of the method provides that an expected temperature profile, a first temperature profile with an upper confidence limit and a second temperature profile with a lower confidence limit are determined for each predicted temperature profile. The first and the second temperature profiles are determined e.g. using an uncertainty estimator. An expectation range (referred to as prediction range), within which the expected temperature profile lies in the worst case and/or best case, is formed by means of the distance formed between the first temperature profile and the second temperature profile.

The respective expected temperature profiles are displayed in the display of the predicted temperature profiles as long as no user interaction is or has been determined. When an interaction which comprises a selection of one of the predicted temperature profiles is detected, the expected temperature profile thereof, the first temperature profile thereof and the second temperature profile thereof are displayed in the display. The different displays without and with an interaction permit, on the one hand, a clearly organized display of the predicted temperature profiles and, on the other hand, precise outputting of the expectation range for a predicted temperature profile which is respectively selected by means of a user interaction.

One development of the method provides that an upper temperature threshold, which represents a hardware limit of the electric motor, and a lower temperature threshold, which is a limit for efficient operation of the electric motor are defined, wherein the respective quality measures for the number of predicted temperature profiles are determined as a function of the defined upper and lower temperature thresholds.

According to one development of the method, the upper and lower temperature thresholds are displayed in the display and can be changed in their absolute value by a user interaction. As a result, for example the restart time can be influenced by virtue of the fact that the upper temperature threshold is adapted within certain limits on the basis of empirical values by means of a user interaction. The efficiency of the operation of the electric motor can be influenced by means of the lower temperature threshold. Generally, the efficiency of the operation of the electric motor can be increased, and the computer-assisted finding of a solution can be facilitated, by a relatively large distance between the upper and lower temperature thresholds. The adaptation of the lower temperature threshold can also be influenced here in a suitable way on the basis of empirical values of a user by means of a user interaction.

Another embodiment of the method provides that the number of the predicted temperature profiles is defined by a user interaction. The speed at which a solution for determining an optimum restart time is found can be positively influenced by the number of the predicted temperature profiles and their outputting in the display.

It is also possible to provide that a prediction range for the temperature is determined for a respective predicted temperature profile in that the difference of a respective temperature maximum is determined for the first and second temperature profiles, which temperature maximum is reached when the assumed switching-off of the electric motor occurs.

The prediction range projects into one or more of the following ranges or lies in said ranges:
- an upper range, which lies above the upper temperature threshold,
- a middle range, which lies between the upper and the lower temperature thresholds,
- a lower range, which lies below the lower temperature threshold.

In this context, the quality measure is determined from the respective portions of the overlapping of the prediction range with the upper range and/or the middle range and/or the lower range.

A further refinement provides that the upper, middle and lower ranges are each assigned a color of a predefined color space, wherein the respective colors are predefined, in particular pure, colors of a central angle of the predefined color space. For example the color space HSI can be used as the color space. Basically, any other known or defined color space is also suitable for implementing the method. The color space can be presented, for example, in a known fashion in a circular shape, wherein the central angle comprises the colors which lie on the circular edge of the color space.

In particular there is provision here that the quality measure is a mixed color of the central angle of the predefined color space.

The mixed color of the quality measure arises as a result of the determination of the portion with which the prediction range lies in the upper and/or the middle and/or the lower range. Depending on the selected distance between the upper and lower temperature thresholds, the prediction range can also lie only in the upper and middle or in the middle and lower or exclusively in the upper or exclusively in the middle or exclusively in the lower range.

A further refinement provides that in the color scale the region between two adjacent quality measures is a color gradient which results from the colors of a shortest connection of the mixed colors of the color space which lie on the color angle of the predefined color space. Depending on the colors via which the shortest connection runs between two adjacent quality measures, a rather more pure (saturated) color gradient or a rather more unsaturated color gradient is obtained. On the basis of the color gradient and the saturation of the colors it is possible for the suitability of a temperature profile for the next restart to be inferred visually, that is to say in a computer-assisted fashion. The mixed color, in particular the purity or saturation thereof therefore provides information on how suitable a specific predicted temperature profile is for a restart.

Therefore, according to a further refinement there is provision that the time information relating to the restart of the electric motor is determined on the basis of the color saturation of the color of the middle range.

The embodiment of the invention also proposes a computer program having means for carrying out the method which is described above and below when the computer program is run on a device or in means of the device of the type described below.

According to a further refinement, the embodiments of the invention purposes a device for the computer-assisted operation of an electric motor which is subjected, during its operation, to a thermal loading by the rotational motion of its rotor. The device comprises at least one control unit and one user interface. The control unit is designed
- to receive measurement data measured during the operation of the electric motor, wherein the measurement data are electrical and/or kinetic physical variables of the electric motor;
- to determine at least one temperature value, approximated to a virtual real value, by means of a mathematical model, derived from a predefineable motor geometry, for physical variables of the overall state of the motor and from the received measurement data as input data;
- to predict a number of temperature profiles with different restart times, wherein the temperature profiles are each dependent on the overall state of the electric motor and/or on the configuration of the electric motor, in order to define a cooling time period for reducing the temperature loading on the electric motor, wherein the approximated temperature value, which results from at least one virtual real value, is input as a respective starting value for a restart into the temperature profile which is to be predicted;
- to map the quality measurements onto a color scale; and
- to determine a respective quality measure for the number of predicted temperature profiles, wherein the quality measure is a measure of the efficiency of how good the restart time is with respect to the expected thermal loading and a minimum of the cooling time period.

The user interface is designed
- to display the temperature profile, which lies in the past, together with the number of predicted temperature profiles in a time/temperature diagram, wherein the number of predicted temperature profiles represents a possible restart of the electric motor at the respective restart time with the respectively determined starting value; and
- to output the color scale visually at the user interface, and to output time information relating to the restart of the electric motor to the control unit in response to a user interaction which is input via the user interface.

According to one expedient refinement, the device can comprise further means for carrying out the method described above and below.

BRIEF DESCRIPTION

Some of the embodiments will be described in detail, with reference to the following figures, wherein like designations denote like members, wherein.

DETAILED DESCRIPTION

Figure 1:
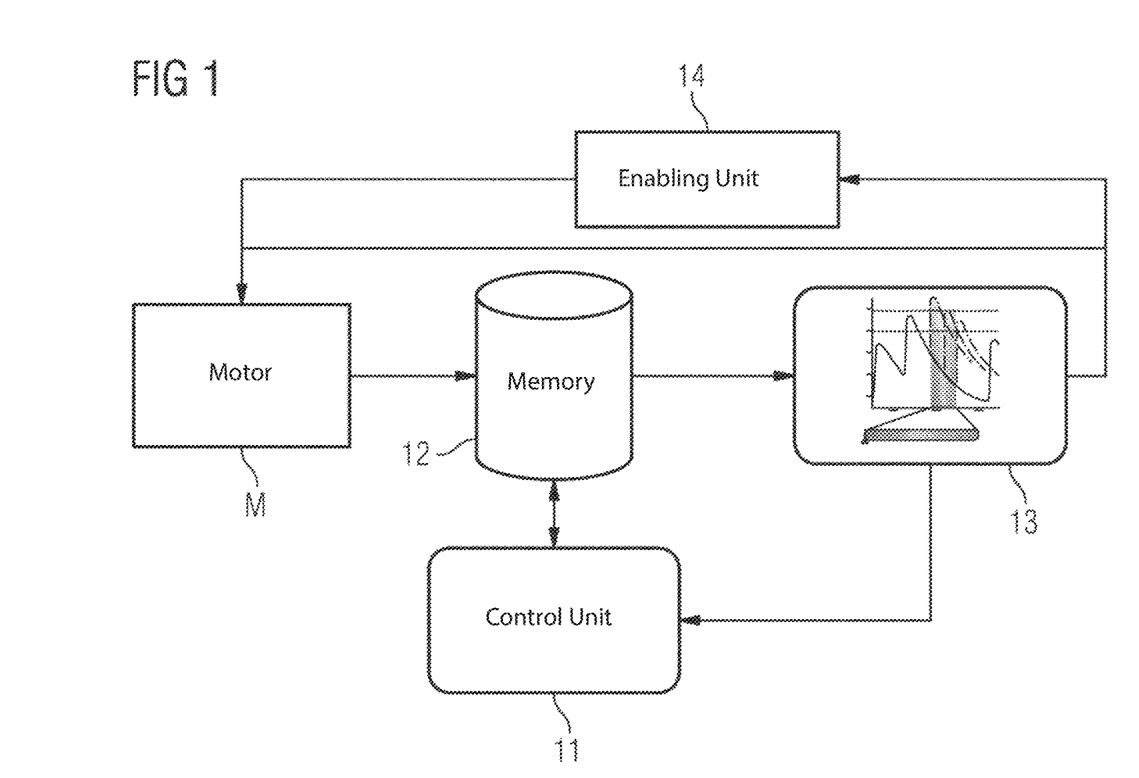
FIG. 1 shows a schematic illustration of a device according to an embodiment of the invention for the computer-assisted operation of an electric motor.

FIG. 1 shows an (electric) motor M, the rotatable rotor thereof, which is not illustrated in more detail in the figure, can be switched on and off by means of a switch, which is not illustrated in more detail either. The electric motor M is controlled by an enabling unit 14 which serves to control the operation of the electric motor M. It is known to determine the motor geometry and, if appropriate, the motor configuration of the electric motor M by means of a model, e.g. a CAD (Computer Aided Design) model. Such a model in a conventional simulation is usually a 3D model, with the result that the simulation calculations are computationally intensive and therefore often not real-time capable.

The electric motor M is equipped with sensors (not illustrated in more detail) for acquiring various electrical and/or kinetic physical variables, e.g. a temperature, a rotational speed forces and the like, wherein the measurement values which are acquired by the sensors are stored in a memory 12. At least one temperature value, from the measured values, which is approximated to a virtual real value is determined by a control unit 11 connected to the memory 12, by means of a mathematical model, derived from the motor geometry, for physical variables of the overall state of the motor. The acquired measured values and the derived variables, which are designated as soft sensor values, are fed to a user interface 13 for display. The user interface 13 comprises at least one display and one input device for a user interaction, but, furthermore, can also have a computing unit (not illustrated in more detail). The user interface 13 is designed to request further soft sensor values and predictions from the control unit 11 for example in response to a user interaction. Furthermore, the user interface 13 is coupled to the enabling unit 14, in order to transmit a restart decision for the electric motor M thereto. The enabling unit 14 carries out the restart of the electric motor M at the time which is transmitted to it, by switching on by the abovementioned switch.

A technical system which comprises such an electric motor M heats up at each switch-on process. The temperature increase which is caused by the switch-on process is much higher here than in the normal operating mode, so that after each switching on a temperature peak occurs, which then drops again slowly in the normal operating mode. When repeated switching on and off occurs, the temperature peaks add up and as a result a maximum permissible temperature limit, which is defined for the electric motor M, can be exceeded. The exceeding of this permissible temperature limit can cause damage to the electric motor M.

The present method permits a decision to be arrived at as to when the electric motor M can be switched on again in the future without risk. The uncertainties which occur hitherto when using mathematical models can be eliminated in this way. An excessively long period in waiting up to a restart in the electric motor M leads in turn to downtimes of the technical system and as a result reduces its efficiency. This gives rise to uneconomic planning.

The present embodiment of the invention permits computer-assisted determination of a restart time, wherein user preferences and user knowledge can be taken into account in the determination of the restart time. The method uses for this purpose a display which maps model solutions where there are uncertainties. The display permits a user interaction, wherein a quality measure is determined for a number of predicted temperature profiles for a potential restart of the electric motor M and is displayed using a color scale. Time information relating to the restart of the electric motor is output in response to a user indication which is input via the user interface 13.

This procedure will be explained in more detail below with reference to FIGS. 2 to 9. FIGS. 2 to 4 and 8 and 9 each show here a temperature/time diagram (T-t diagram) in which a historical profile of the temperature $T_V$ is illustrated as a line. The historical temperature profile $T_V$ can be obtained by processing the received measurement data and the soft sensor values derived therefrom. By using the soft sensor values it is possible to determine, for example, temperatures at such points on the electric motor M at which it is not possible to physically attach a temperature sensor.

In addition, a considered prediction time period, starting at the time $t_0$ and ending at the time $t_{end}$, is illustrated in the temperature/time diagram. This prediction time period is emphasized in the temperature/time diagram by a color gradient. The prediction time period which is emphasized in color permits a simplified user interaction with a determination of an optimum restart time.

The suitability of a time lying in the time interval between t0 and tend is characterized with respect to its suitability for a restart by the color gradient of the prediction time period. In the case of the color schema selected in the present exemplary embodiment, for example a red color means that an upper temperature threshold TSo is exceeded when switching on occurs at a time which lies in a region with a red color. The upper temperature threshold TSo is a hardware limit of the electric motor M, the exceeding of which means that damage to the electric motor M is probable. In the present exemplary embodiment, the upper temperature threshold TSo is approximately T=1250° C.

In addition, a lower temperature threshold TSu is indicated in the temperature/time diagram, wherein the temperature of the lower temperature threshold TSu is selected to be lower than the temperature of the upper temperature threshold TSo (here approximately 1150° C.). The lower temperature threshold TSu represents a limit for efficient operation of the electric motor M. Restart times, which are selected in such a way that they result in inefficient operation of the electric motor M, are characterized by blue in the present color scheme.

The limits of the prediction time period are selected such that a red color value is generally assigned to the start of the prediction time period at the time $t_0$, while a blue color value is assigned to the end of the prediction time period $t_{end}$. In accordance with the selected color schema, a color gradient is obtained between these colors, which in the present exemplary embodiment changes from red to blue via orange, yellow and green. A restart time which is suitable for a restart would be represented e.g. by a green color value. A suitable restart time is a time within the prediction time period (i.e. a time between $t_0$ and $t_{end}$) at which a temperature maximum of the predicted temperature profile does not exceed the upper temperature threshold TSo and does not undershoot the lower temperature threshold TSu.

The color gradient illustrated in the prediction time period of the temperature/time diagram is, furthermore, illustrated in an enlarged form in a linear color scale 20. In this color scale 20, illustrated below the temperature/time diagram, the color transition for a user interaction is enlarged owing to its enlarged illustrating, and can therefore be perceived more easily. The color scale 20 starts at the time $t_0$ and ends at the time $t_{end}$.

Figure 2:
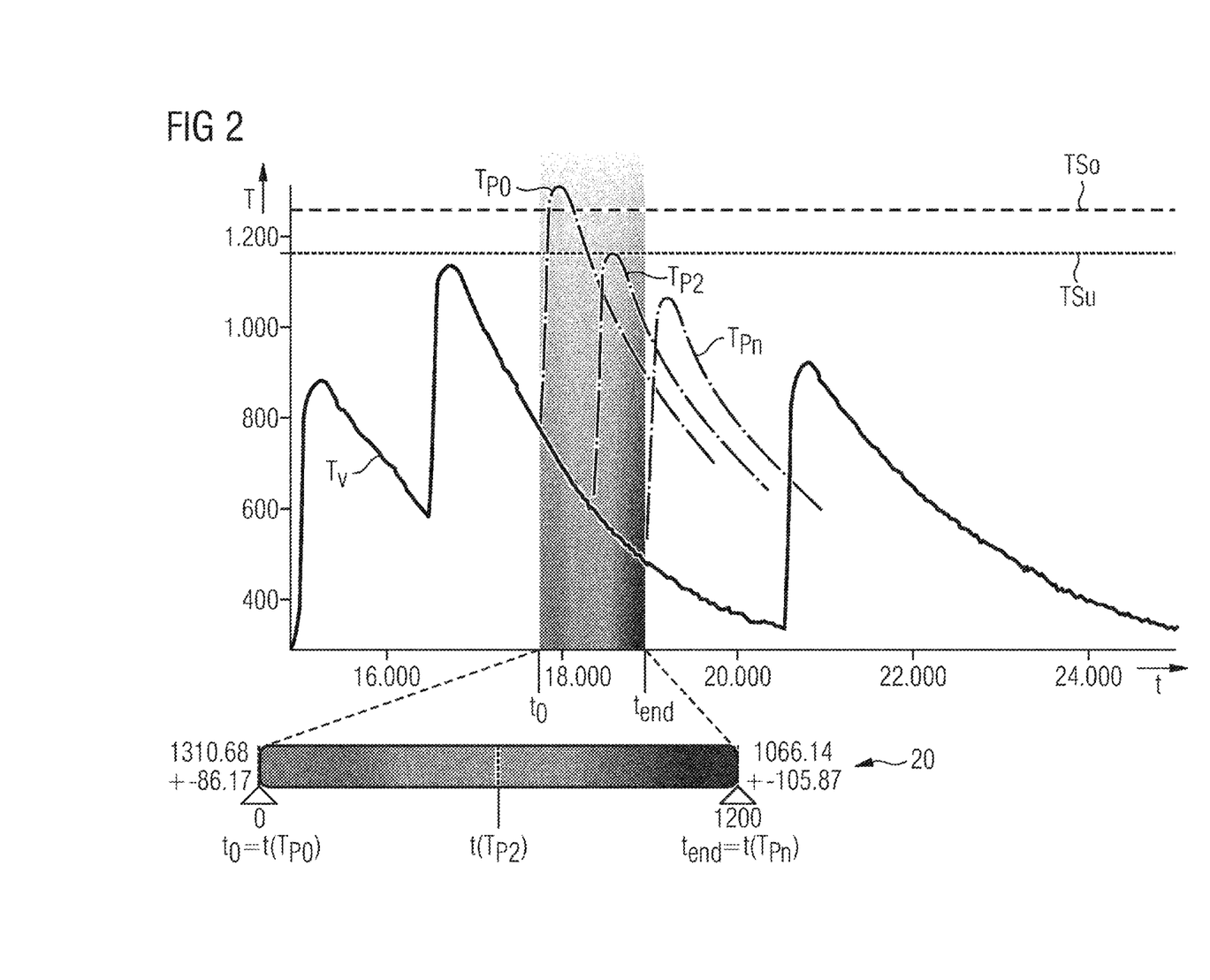
FIG. 2 shows a schematic illustration of a display of predicted temperature profiles for determining time information relating to the restart of the electric motor, wherein none of the predicted temperature profiles is suitable for a restart of the electric motor.
Figure 3:
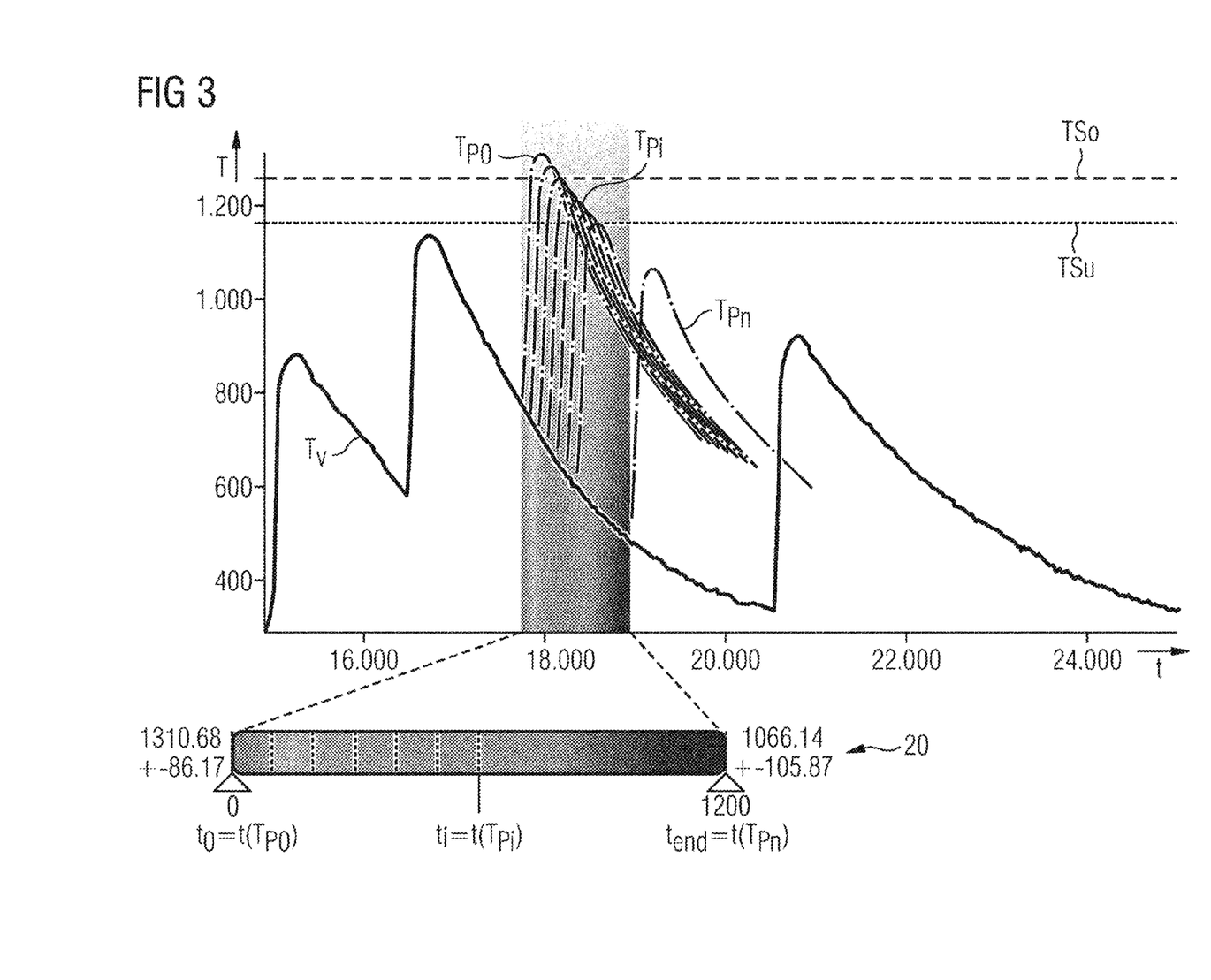
FIG. 3 shows the display, to which a plurality of predicted temperature profiles are added, from FIG. 2.

In the temperature/time diagram in FIG. 2, for example three predicted temperature profiles $T_{P0}$, $T_{P2}$ and $T_{Pn}$ are indicated. The restart time of the predicted temperature profile $T_{P0}$ is at the time $t(T_{P0})$ (compare color scale 20), the restart time of the predicted temperature profile $T_{P2}$ is at the time $t(T_{P2})$ (see color scale 20), and the restart time of the predicted temperature profile $T_{Pn}$ lies at the end of the considered prediction time $t(T_{Pn})=t_{end}$.

In the color scale 20, the respective restart times $t(T_{Pi})$ (i with=0,2,n) are each illustrated as vertical, non-continuous lines, so that it is possible to recognize in which region of the color gradient the respective restart time $t(T_{Pi})$ lies. As can be easily recognized, the restart time $t(T_{P0})$ of the predicted temperature profile $T_{P0}$ lies in a red color value (i.e. lying entirely on the left in the color scale), since the maximum value of the predicted temperature profile lies above the upper temperature threshold TSo. As a result, there would be the risk of damage by overheating. The restart time $t(T_{Pn})$ of the predicted temperature profile $T_{Pn}$ has a blue color value (i.e. lying entirely to the right in the color scale), since its maximum temperature value lies below the lower temperature threshold TSu. As a result, inefficient operation of the electric motor would be brought about. Accordingly, the restart time $t(T_{P2})$ of the predicted temperature profile $T_{P2}$ lies at a color value which assumes a mixed color between green and blue. This means that although the predicted temperature profile does not exceed the upper temperature threshold TSo, it appears to give rise to inefficient operation. This can also be recognized from the fact that the temperature maximum of the predicted temperature profile $T_{P2}$ lies at the limit or just below the lower temperature threshold TSu.

The color scale 20 therefore permits intuitive and simple use to find out whether a predicted temperature profile which is determined in a computer-assisted fashion has a suitable or unsuitable restart time.

Basically, the color scale 20 which is shown in FIG. 2 can be used by a user to select, from the displayed predicted temperature profile $T_{Pi}$, where i=1 . . . n, a predicted temperature profile which appears suitable, by means of a user interaction, so that the user interface 13 outputs its starting value $t(T_{Px})$ at the restart of the electric motor M. The color scale 20 serves primarily to facilitate the user interaction. The determination as to which predicted temperature profiles $T_{Pi}$ and the restart times $t(T_{Pi})$ which are associated therewith are basically determined in a computer-assisted fashion, wherein suitable predicted temperature profiles $T_{Pi}$ and the assigned restart times $t(T_{Pi})$ are characterized in a corresponding way.

A suitable restart time could not be determined with the predicted temperature profiles $T_{P0}$, $T_{P2}$ and $T_{Pn}$ shown in FIG. 2. Therefore, by using a user interaction, a user can initiate the determination of further predicted temperature profiles $T_{Pi}$. This is illustrated schematically in FIG. 3, in which, in the considered predicted time period, a multiplicity of predicted time profiles $T_{Pi}$ are illustrated in the temperature/time diagram. The point at which the predicted temperature profiles $T_{Pi}$ are produced can be influenced by the fact that a corresponding interaction is carried out by using a user interaction, e.g. using an input device (e.g. mouse) in the linear color scale 20. For example, the user can for this purpose select a color value in the color scale and as a result initiate the generation of a predicted temperature profile at the corresponding restart time. At the points at which a selection would be made by the user, a respective predicted temperature profile $T_{Pi}$ is then produced. For the sake of simplicity, just a single profile of the predicted temperature profiles whose restart time lies at $t_i=t(T_{Pi})$ in the linear color scale 20, is generally characterized by $T_{Pi}$ both in the temperature/time diagram and in the linear color scale 20.

The color gradient is newly determined by adding one or more further predicted temperature profiles $T_{Pi}$. For this purpose, for each restart time $t_i$ which is assigned to a predicted temperature profile a quality measure is calculated which is a mixed color from the predefined color space used. This procedure is described in more detail below. Furthermore, the color gradient between the respective two adjacent restart times of the assigned predicted temperature profiles is then redetermined. The more predicted temperature profiles have been produced, the more precisely can the color gradient be calculated between two adjacent restart times. This results, on the one hand, in clearer information about the suitability of the restart time for the user. On the other hand, the computer-assisted determination of suitable restart times is made possible by continuous approximation, in a way similar to an iterative optimization method.

The prediction of a respective temperature profile with an assigned restart time is dependent on the overall state of the electric motor M and/or the configuration of the electric motor. In this context, a cooling time period for reducing the thermal loading on the electric motor is determined, wherein the cooling time period, the time period between the predicted restart time and the start of the prediction time period, i.e. $t_0$, is determined. The approximated temperature value at the determined restart time results from at least one soft sensor value and/or the previously determined measurement values. The approximated temperature value can then be assigned to a start value which represents the restart time for the predicted temperature profile.

Figure 4:
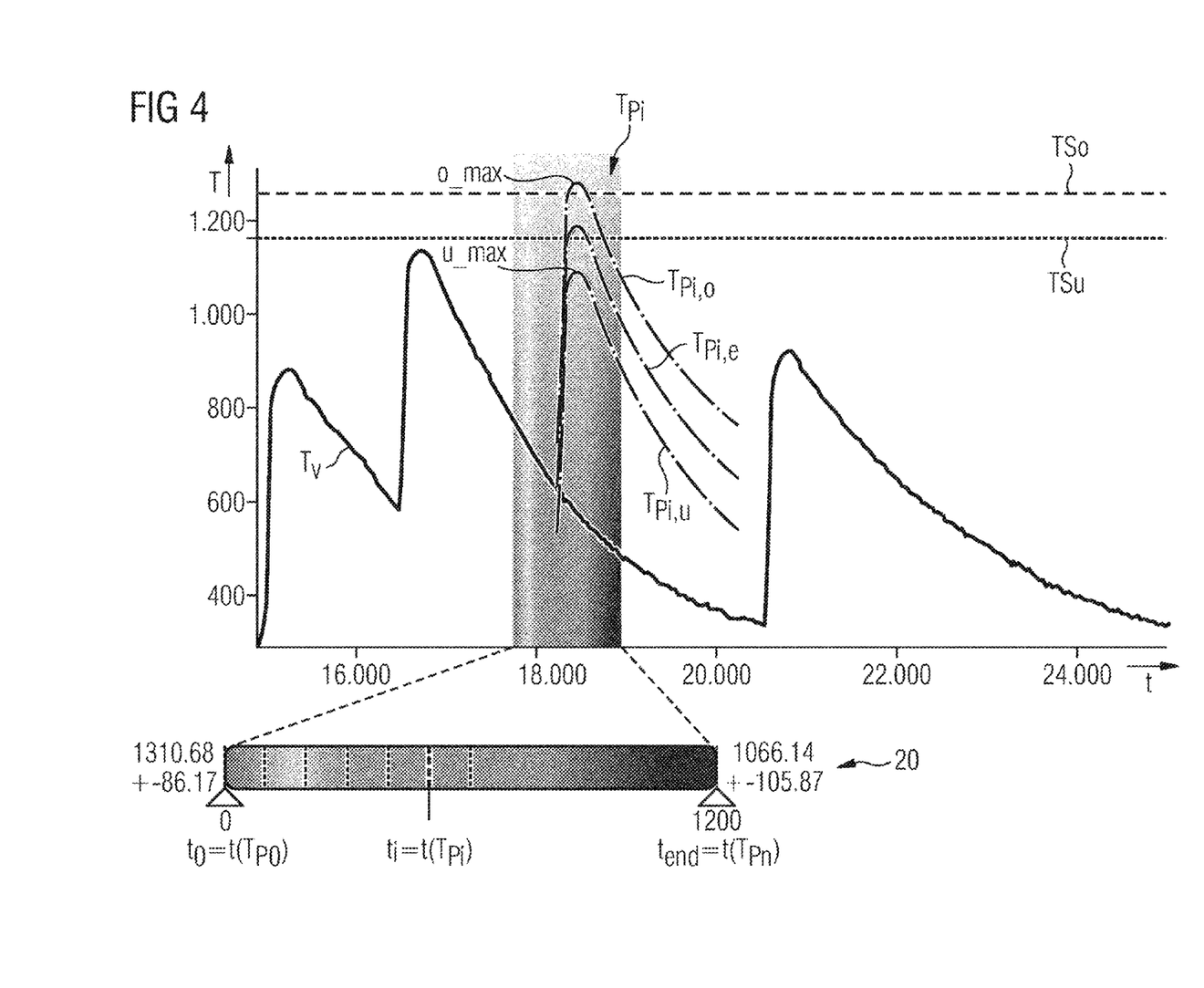
FIG. 4 shows a display of the temperature/time diagram which is shown in FIG. 3, wherein one of the predicted temperature profiles, shown in FIG. 3, is selected for a further analysis.

Depending on how many predicted temperature profiles $T_{Pi}$ are represented in the temperature/time diagram, it is, under certain circumstances, difficult for a user to detect which of the predicted time profiles has a suitable restart time for the restart of the electric motor M. For this purpose, the user can select one of the predicted temperature profiles by means of an interaction in the linear color scale 20. This is done by virtue of the fact that for example a mouse cursor is clicked on one of the dashed lines assigned to the predicted temperature profile. In FIG. 4, the second line from the right in the green region is selected. As a result, the predicted temperature profiles which are not selected in the relevant prediction time period of the temperature/time diagram are removed. Only the predicted temperature profile $T_{Pi}$ which was selected is represented.

In this context, the predicted temperature profile $T_{Pi}$ comprises an expected temperature profile $T_{Pi,e}$, a first (upper) temperature profile $T_{Pi,o}$ with an upper confidence limit and a second (lower) temperature profile $T_{Pi,u}$ with a lower confidence limit. The expected temperature profile $T_{Pi,e}$ corresponds to the temperature profile which would result taking the customary process determination as a basis. The first and the second temperature profile represent possible deviations of the expected temperature profile in the upward and downward directions. It can be well recognized here that a temperature maximum omax of the first (upper) temperature profile $T_{Pi,o}$ comes to lie above the upper temperature threshold TSo. A lower temperature maximum u_max of the second (lower) temperature profile of the predicted temperature profile $T_{Pi}$ lies, in contrast, below the lower temperature threshold TSu. Although the temperature maximum of the expected temperature profile $T_{Pi,e}$ lies between the upper and the lower temperature thresholds, the selected predicted temperature profile $T_{Pi}$ would not be suitable as a restart time owing to the exceeding of the upper temperature threshold TSo with its upper confidence limit. A user who selected the restart time $t_i$, even though it has a color value in the green region, would therefore have a high probability of carrying out an inefficient start. Since the computer-assisted determination automatically takes into account the upper and lower confidence limits for each predicted temperature profile $T_{Pi}$, the selected predicted temperature profile $T_{Pi}$ which is shown here would not be predicted as a suitable restart time.

For the computer-assisted determination of the quality measure and of the color value which is associated therewith, a prediction range EW is processed which is calculated from the difference between the temperature maximum omax of the first temperature profile $T_{Pi,o}$ and the temperature maximum u_max of the second temperature profile $T_{Pi,u}$. The prediction range EW is illustrated in the temperature/time diagram in FIG. 5.

Figure 5:
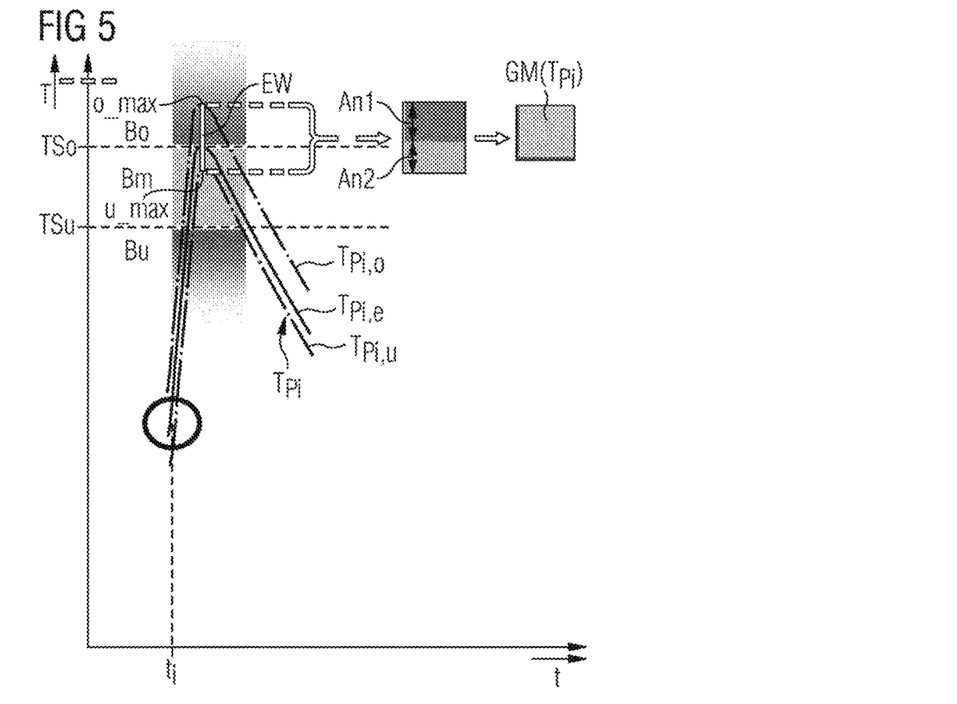
FIG. 5 shows a temperature/time diagram in which the determination of a quality measure is illustrated schematically on the basis of a selected predicted temperature profile.

A detail of the predicted temperature profile $T_{Pi}$ is illustrated in this diagram. In the text which follows, it is determined how the prediction range EW lies in relation to ranges Bo, Bm and Bu which are divided up by the upper temperature threshold TSo and the lower temperature threshold TSu. Bo characterizes an upper range which lies above the upper temperature threshold TSo. Bm characterizes a middle range which lies between the upper and the lower temperature thresholds TSo and TSu. The lower range which lies below the lower temperature thresholds TSo is characterized by Bu. The upper, the medium and the lower ranges Bo, Bm and Bu are each assigned a color of the predefined color space. For example, if the upper range Bo is assigned the color red, the middle range Bm is assigned the color green and the lower range Bu is assigned the color blue. The assigned colors are, in particular, pure colors of a central angle of the predefined color space.

In the text which follows it is now determined which proportional portions of the prediction range EW lies in the respective range Bo, Bm and Bu. In the present exemplary embodiment here, the prediction range EW lies partially in the upper range Bo and partially in the middle range Bm. For example it is assumed that a portion An1 of the prediction range EW lies ⅔ in the upper range Bo, and a portion An2 lies ⅓ in the middle range Bm. Owing to colors, assigned to the upper range Bo and the middle range Bm, of the color angle of the predefined color space, a mixed color which represents the quality measure is obtained in accordance with the portions An1 and An2. For example, the mixture of red and blue in a ratio of 2:1 results in the color orange. The color value which results from the described procedure is at a color angle, i.e. the circle line, of the predefined color space, which is illustrated by way of example in FIG. 6.

Figure 6:
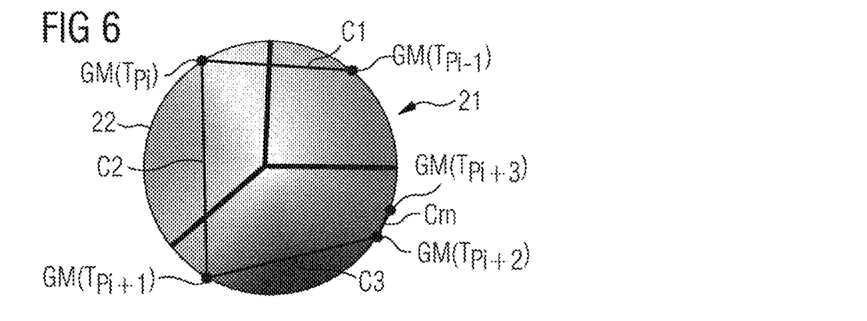
FIG. 6 shows a predefined color space for determining the color space of a color scale to be generated.
Figure 7:
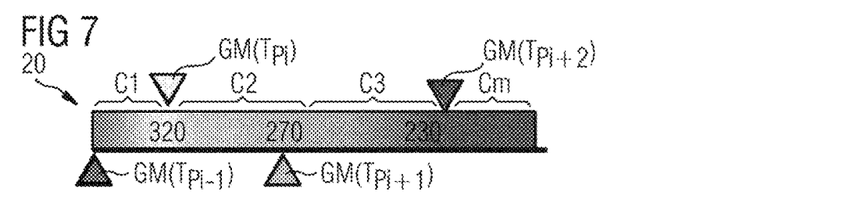
FIG. 7 shows a color scale which is generated using the color space shown in FIG. 6.
Figure 8:
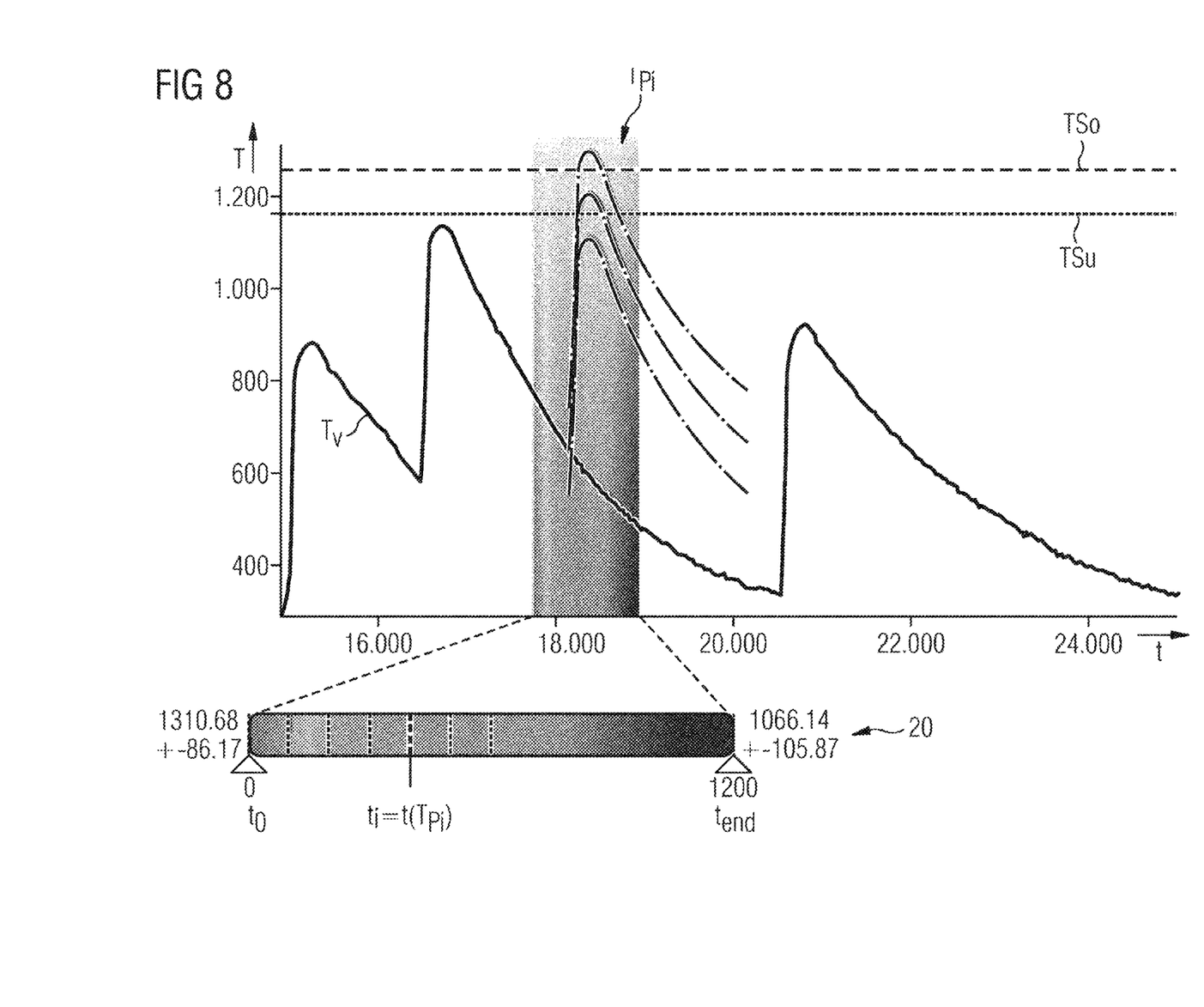
FIG. 8 shows a temperature/time diagram with a selected predicted temperature profile with given upper and lower temperature thresholds.
Figure 9:
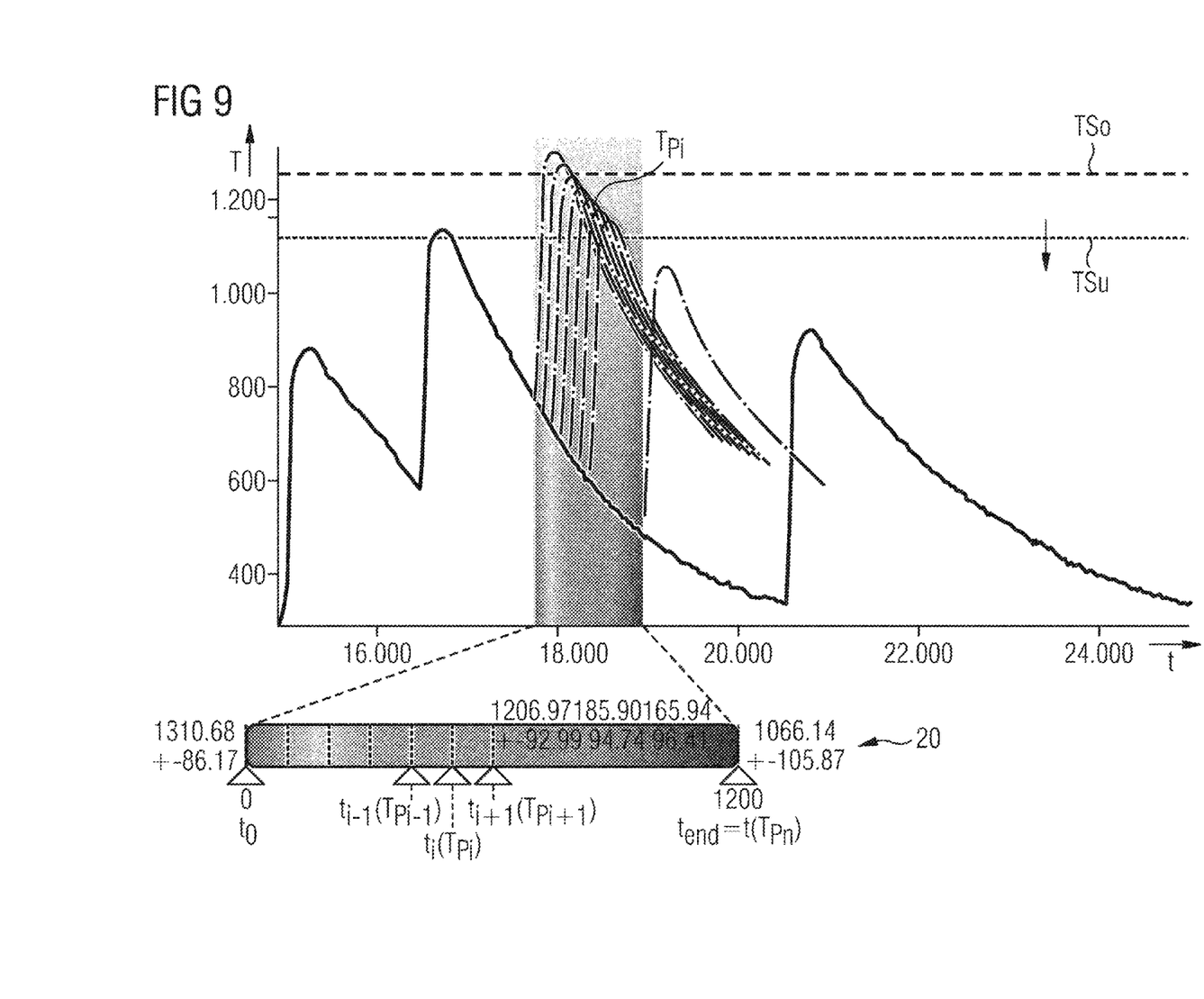
FIG. 9 shows a temperature/time diagram together with a changing color scale with a lower temperature limit which is varied with respect to the illustration in FIG. 8.

The quality measure of the considered predicted temperature profile $GM(T_{Pi})$ which, as illustrated in FIG. 5, has been determined, represents a point on the color angle 22 of the predefined color space 21 which is illustrated in FIG. 6. In order to determine the linear color scale 20, for a respective predicted temperature profile $T_{Pi}$ its quality measure GM is determined in the way described above and is entered at the color angle 22 of the color space 21. In the exemplary embodiment shown in FIG. 6, five predicted temperature profiles $T_{Pi-1}$, $T_{Pi}$, $T_{Pi+1}$, $T_{Pi+2}$ and $T_{Pi+3}$ are represented. The respectively assigned quality measures $GM(T_{Pi-1})$, $GM(T_{Pi})$, . . . are represented with their assigned color values in the linear color scale 20 in FIG. 7. The color gradients which are obtained between two adjacent quality points GM result from the respectively shortest connection Cn, wherein n=1 . . . m, between the respectively adjacent quality points GM. The shortest connection C1 in FIG. 6 connects the quality measures $GM(T_{Pi-1})$ and $GM(T_{Pi})$. The connection C2 connects the quality measures $GM(T_{Pi})$ and $GM(T_{Pi+1})$ etc. The color values which lie on the respective shortest connection Cn represent the color gradient between the adjacent quality measures GM in the linear color scale 20.

It is readily understandable that the purity or saturation of the colors or of the color gradient of the color scale is greater the greater the number of determined quality measures for predicted temperature profiles $T_{Pi}$. In other words, the saturation of the linear color scale and therefore the informative power with respect to a restart point which is to be found can be increased if the number of predictions is increased.

If it is not possible to find, with the procedure described in this way, at least one predicted temperature profile $T_{Pu}$ with an associated restart time $t_i$ at which it is ensured that the upper temperature threshold TSo is not exceeded in any case and at the same time if efficient operation is ensured, i.e. the lower temperature threshold TSu is not undershot, it is possible to increase the convergence of the method by varying the upper and/or lower temperature thresholds TSo and TSu. This is illustrated schematically in FIGS. 8 and 9, wherein in FIG. 8 only one selected predicted profile $T_{Pi}$ is illustrated, which temperature profile $T_{Pi}$ lies in the green region of the linear color scale 20 but its confidence limits lie above the upper temperature threshold TSo and the lower temperature threshold TSu. By, for example, reducing the value of the lower temperature threshold TSu it is then possible to find directly three possible restart times $t_{i-1}(T_{Pi-}$ 1), $t_i(T_{Pi})$ and $t_{i+1}(T_{Pi+1})$ with associated predicted temperature profiles at which a reasonable restart is possible. The multiplicity of possible restart times is displayed in the linear color scale 20, for example, by corresponding symbols (here triangles) and by specifying the time period since the prediction was carried out. By selecting one of the symbols, the time information which is assigned to the symbol is transmitted from the user interface to the enabling unit 14, and the electric motor M is restarted e.g. 400 s after the described method has been carried out.

The linear color scale shows through the degree of the color saturation whether a decision is sufficiently reliable and whether sufficient predictions have been used to be able to carry out a determination of a suitable restart time. For the case in which the color saturation turns out to be too low, i.e. the points which are located adjacently at the color angle 22 of the predefined color space 21 are located too far apart from one another, it is possible to initiate the generation of one or more further predicted temperature profiles by means of user interaction on the linear color scale. These temperature profiles are then taken into account directly in the display of the interactive color scale. After the computer-assisted arrival at a decision, the specific decision for the restart and the time of the restart is made by means of user interaction and is transmitted to the enabling unit 14.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for the computer-assisted operation of an electric motor which is subjected, during an operation of the electric motor, to a thermal loading by a rotational motion of a rotor of the electric motor, the method comprising:
   receiving measurement data measured during the operation of the electric motor, wherein the measurement data are electrical and/or kinetic physical variables of the electric motor;
   determining at least one temperature value, approximated to a virtual real value, by means of a mathematical module, derived from a predefineable motor geometry, for physical variables of an overall state of the motor, and from the received measurement data as input data;
   predicting a number of temperature profiles with different restart times, wherein the temperature profiles are each dependent on the overall state of the electric motor and/or on a configuration of the electric motor, in order to define a cooling time period for reducing the thermal loading on the electric motor, wherein the approximated temperature value, which results from the at least one virtual real value, is input as a respective starting value for a restart into the temperature profile which is to be predicted;
   displaying a temperature profile which lies in the past, together with the number of predicted temperature profiles in a time/temperature diagram, wherein the number of predicted temperature profiles represents a possible restart of the electric motor at the respective restart time with the respectively determined starting value;
   determining a respective quality measure for the number of predicted temperature profiles, wherein the quality measure is a measure of the efficiency of how good the restart time is with respect to the expected thermal loading and a minimum of the cooling time period; and
   mapping the quality measures onto a color scale which is visually output at a user interface, wherein time information relating to the restart of the electric motor is output in response to a user interaction which is input via the user interface.

2. The method as claimed in claim 1, wherein an expected temperature profile, a first temperature profile with an upper confidence limit and a second temperature profile with a lower confidence limit are determined for each predicted temperature profile.

3. The method as claimed in claim 2, wherein, in the display of the predicted temperature profiles, the respective expected temperature profiles are displayed as long as no user interaction is or has been determined.

4. The method as claimed in claim 2, wherein, when an interaction which comprises a selection of one of the predicted temperature profiles is detected, the expected temperature profile thereof, the first temperature profile thereof and the second temperature profile thereof are displayed in the display.

5. The method as claimed in claim 1, wherein an upper temperature threshold, which represents a hardware limit of the electric motor, and a lower temperature threshold, which is a limit for an efficient operation of the electric motor are defined, wherein the respective quality measures for the number of predicted temperature profiles are determined as a function of the defined upper and lower temperature thresholds.

6. The method as claimed in claim 5, wherein the upper and lower temperature thresholds are displayed in the display and can be changed in their absolute value by a user interaction.

7. The method as claimed in claim 1, wherein the number of predicted temperature profiles is defined by a user interaction.

8. The method as claimed in claim 2, wherein a prediction range for the temperature is determined for a respective predicted temperature profile in that the difference of a respective temperature maximum is determined for the first and second temperature profiles, which temperature maximum is reached when the assumed switching-off of the electric motor occurs.

9. The method as claimed in claim 8, wherein the prediction range projects into one or more of the following ranges or lies in said ranges:
   an upper range, which lies above the upper temperature threshold,
   a middle range, which lies between the upper and the lower temperature thresholds,
   a lower range, which lies below the lower temperature threshold, wherein the quality measure is determined from the respective portions of the overlapping of the prediction range with the upper range and/or the middle range and/or lower range.

10. The method as claimed in claim 9, wherein the upper, middle and lower ranges are each assigned a color of a predefined color space, further wherein the respective colors are predefined, pure, colors of a central angle of the predefined color space.

11. The method as claimed in claim 10, wherein the quality measure is a mixed color of the central angle of the predefined color space.

12. The method as claimed in claim 9, wherein in the color scale the region between two adjacent quality measures is a color gradient which results from the colors of a shortest connection of the mixed colors of the quality measure which lie on the color angle of the predefined color space.

13. The method as claimed in claim 9, wherein the time information relating to the restart of the electric motor is determined on the basis of the color saturation of the color of the middle range.

14. A computer program, comprising a computer readable hardware storage device having computer readable program code stored therein, said program code executable by a processor of a computer system to implement a method comprising:

receiving measurement data measured during the operation of the electric motor, wherein the measurement data are electrical and/or kinetic physical variables of the electric motor;

determining at least one temperature value, approximated to a virtual real value, by means of a mathematical module, derived from a predefineable motor geometry, for physical variables of an overall state of the motor, and from the received measurement data as input data;

predicting a number of temperature profiles with different restart times, wherein the temperature profiles are each dependent on the overall state of the electric motor and/or on a configuration of the electric motor, in order to define a cooling time period for reducing the thermal loading on the electric motor, wherein the approximated temperature value, which results from the at least one virtual real value, is input as a respective starting value for a restart into the temperature profile which is to be predicted;

displaying a temperature profile which lies in the past, together with the number of predicted temperature profiles in a time/temperature diagram, wherein the number of predicted temperature profiles represents a possible restart of the electric motor at the respective restart time with the respectively determined starting value;

determining a respective quality measure for the number of predicted temperature profiles, wherein the quality measure is a measure of the efficiency of how good the restart time is with respect to the expected thermal loading and a minimum of the cooling time period; and mapping the quality measures onto a color scale which is visually output at a user interface, wherein time information relating to the restart of the electric motor is output in response to a user interaction which is input via the user interface.

15. A device for the computer-assisted operation of an electric motor which is subjected, during an operation of the electric motor, to a thermal loading by a rotational motion of a rotor of the electric motor, the device comprising:

a control unit which is designed:

to receive measurement data measured during the operation of the electric motor, wherein the measurement data are electrical and/or kinetic physical variables of the electric motor;

to determine at least one temperature value, approximated to a virtual real value, by means of a mathematical model, derived from a predefineable motor geometry, for physical variables of the overall state of the motor and from the received measurement data as input data;

to predict a number of temperature profiles with different restart times, wherein the temperature profiles are each dependent on the overall state of the electric motor and/or on the configuration of the electric motor, in order to define a cooling time period for reducing the temperature loading on the electric motor, wherein the approximated temperature value, which results from at least one virtual real value, is input as a respective starting value for a restart into the temperature profile which is to be predicted;

to map the quality measurements onto a color scale; and to determine a respective quality measure for the number of predicted temperature profiles, wherein the quality measure is a measure of the efficiency of how good the restart time is with respect to the expected thermal loading and a minimum of the cooling time period;

a user interface which is designed to display the temperature profile, which lies in the past, together with the number of predicted temperature profiles in a time/temperature diagram, wherein the number of predicted temperature profiles represents a possible restart of the electric motor at the respective restart time with the respectively determined starting value;

to output the color scale visually at the user interface, and to output time information relating to the restart of the electric motor to the control unit in response to a user interaction which is input via the user interface.

* * * * *